No. 643,809. Patented Feb. 20, 1900.
H. BUCKLEW.
BINDER ATTACHMENT.
(Application filed Aug. 29, 1899.)
(No Model.)
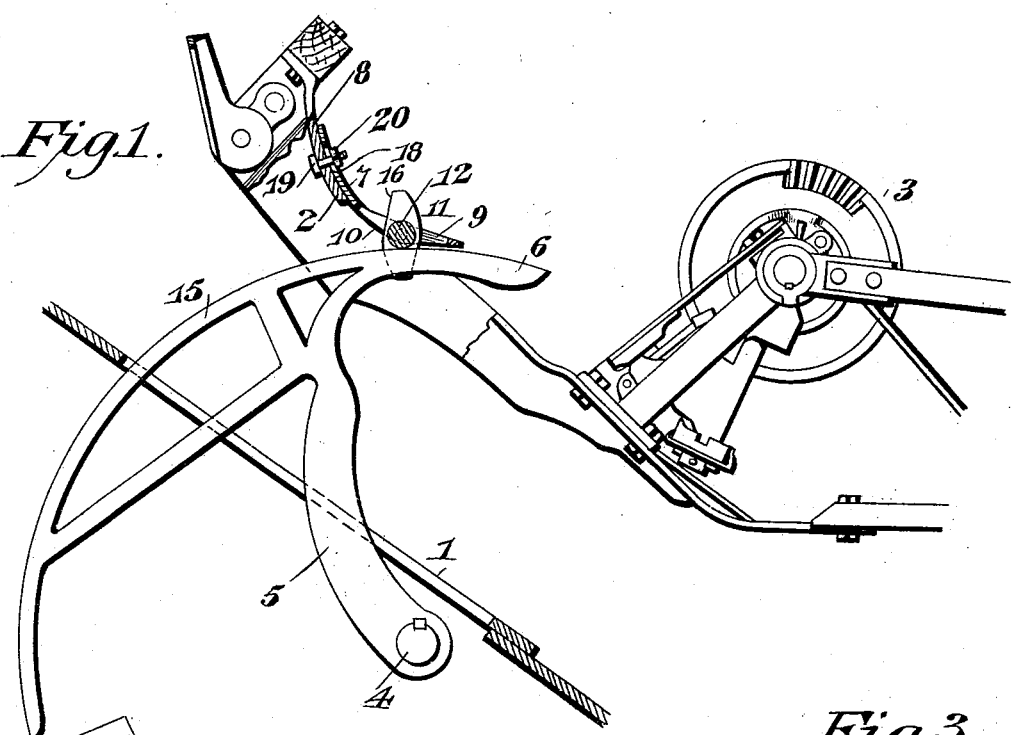
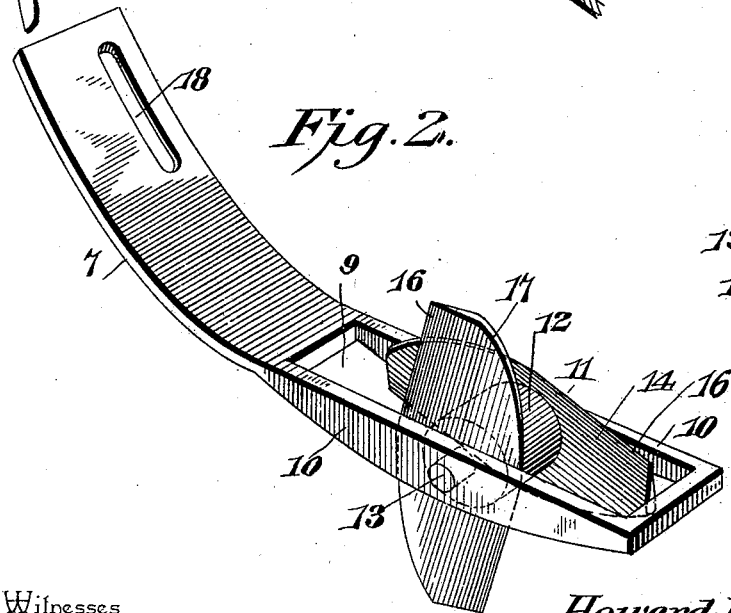
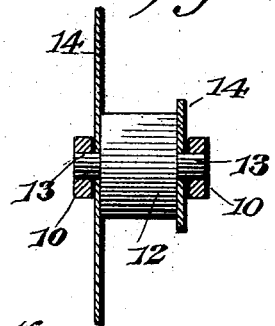
Witnesses
Jas. F. McCathran
Louis G. Julihn
Howard Bucklew, Inventor
By his Attorneys,
C. A. Snow & Co.

UNITED STATES PATENT OFFICE.

HOWARD BUCKLEW, OF WARSAW, OHIO.

BINDER ATTACHMENT.

SPECIFICATION forming part of Letters Patent No. 643,809, dated February 20, 1900.

Application filed August 29, 1899. Serial No. 728,908. (No model.)

*To all whom it may concern:*

Be it known that I, HOWARD BUCKLEW, a citizen of the United States, residing at Warsaw, in the county of Coshocton and State of Ohio, have invented a new and useful Binder Attachment, of which the following is a specification.

This invention relates to grain-binder attachments.

The object of the invention is to provide an attachment for binders which will be automatically operated by the binder mechanism to remove straw or other debris from the needle as the latter passes to the knotter from the sheaf.

Referring to the drawings, Figure 1 is a view of so much of a grain-binder as is necessary to illustrate the application and operation of the attachment, which is illustrated in section. Fig. 2 is a detail perspective view of my attachment detached; and Fig. 3 is a detail sectional view of the attachment on the axial line of the rotary cutter, the roller and its trunnions being shown in elevation.

Referring to the numerals of reference employed to designate corresponding parts throughout the several views, 1 indicates the decking, 2 the overhead breastplate, 3 the knotter or tying mechanism, 4 the binder-arm shaft, 5 the binder-arm, and 6 the curved needle, of a grain-binder of ordinary type. The function and operation of these various elements are too well understood in the art to require explanation for the purpose of disclosing the utility of my attachment. It may be premised, however, that the needle as it rises from the sheaf frequently becomes entangled with one or more straws, which are ultimately carried into the knotter by the sweep of the needle and endanger the effective operation of the mechanism. My invention therefore comprehends a simple rotary cutter or clearing device operated by the needle and serving to clear the latter of straws or other debris at a point in advance of the knotting or tying mechanism.

In its broadest aspect the invention comprises needle-clearing mechanism, but specifically it comprises a longitudinally-curved frame-plate 7, preferably slightly resilient, secured at one end to one of the horizontal flanges 8 of the overhead breastplate 2 and provided at its opposite end with an elongated, preferably rectangular, opening 9, defining side bars 10, between which the rotary cutter 11 is journaled.

Any desired form of cutter or other clearing device adapted for actuation by the needle or otherwise may be employed; but I prefer to provide a roller 12, the trunnions 13 of which are journaled in the bars 10, and to mount a pair of blades or cutters 14 at the opposite ends of the roller 12. These cutters rotate in proximity to the opposite sides of the needle, the upper or outer curved face 15 of which contacts with the roller 12 and serves by its movement as it swings toward the knotter to rotate the cutter and cause the knives to sever the straw or other debris, which if carried into the knotter by the needle might serve to derange the comparatively delicate mechanism of the former.

The individual knives or cutters, while disposed in parallel vertical planes, are arranged longitudinally at right angles, and the opposite sides of each cutter are sharpened, as indicated at 16, from the extremity of the cutter to a point opposite its axis, the opposite edges of these sharpened ends being preferably left dull and curved, as indicated at 17, in order that the cutter may be reversed and the dull edges utilized for the removal of the debris when the character of the latter is such that the knives would be less effective than the edges 17.

Any suitable means for connecting the frame-plate 7 with the flange 8 may be provided; but in order that a slight adjustment of the plate may be effected I prefer to provide it with an elongated slot 18 adjacent to one of its side edges for the reception of a bolt 19, passing through the plate 8 and secured by a nut 20, screwed down upon the face of the plate 7. By means of this adjustment the roller 12 may be initially positioned in contact with the end or point of the needle, and the resiliency of the frame-plate heretofore mentioned will maintain the contact between the roller and the face 15 of the needle, notwithstanding the fact that the latter is sometimes other than the segment of a circle.

What I claim is—

1. An attachment for grain-binders comprising a support and a revoluble needle-clearer mounted on the support and sustained thereby for a part of the clearer to turn in a plane contiguous to the path of a binder-needle, substantially as described.

2. An attachment for grain-binders comprising a spring-support and a revoluble needle-clearer journaled on the support and sustained in a position for a member thereof to turn in a plane parallel with and contiguous to the path of a binder-needle, substantially as described.

3. An attachment for grain-binders comprising a spring-support having means for adjustably fastening the support to a binder-frame, and a revoluble needle-clearer mounted on the support and sustained thereby for an element to turn in a plane contiguous to the path of a binder-needle, substantially as described.

4. An attachment for grain-binders comprising a support, and a revoluble needle-clearer mounted thereon and provided with a frictional driving-roller and with a blade, the latter being revoluble in a plane contiguous to the path of a binder-needle, substantially as described.

5. A binder attachment comprising a resilient frame-plate and a rotary cutter mounted therein and composed of a roller designed to contact with the needle of a binder, and cutters carried at the ends of the roller and designed to sweep the opposite sides of the binder-needle, substantially as specified.

6. In a grain-binder, the combination with a needle, of a revoluble clearer driven from said needle and having an element disposed contiguous to the needle, substantially as described.

7. In a grain-binder, the combination with a needle, of a revoluble clearer driven by frictional engagement with said needle and having an element disposed for rotation in a plane contiguous to a side of the needle, substantially as described.

8. In a grain-binder the combination with a needle, of an adjustable frame-plate, and a rotary cutter mounted in the frame-plate and composed of a roller contacting with the back of the needle, and a blade arranged to sweep in close proximity to the side of the needle, substantially as specified.

9. In a grain-binder, the combination with a needle, of an adjustable resilient frame-plate, and a rotary cutter mounted in said plate, and comprising a roller designed to contact with the curved back of the needle, and a pair of knives arranged at the ends of the roller and designed to sweep the sides of the needle, substantially as specified.

10. In a binder, the combination with a needle, of a needle-clearer actuated by movement of the needle and having a blade disposed contiguous, and in positively-movable relation to, a side of the needle, substantially as described.

11. In a binder, the combination with a needle, of a rotary needle-clearer spanning the back of the needle and engaging frictionally therewith, said needle-clearer having blades contiguous to the sides of the needle, substantially as described.

12. In a binder, the combination with a needle, of a needle-clearer engaging with the back of said needle and having a blade disposed contiguous to a side thereof, and means for yieldably presenting the needle-clearer to said needle, substantially as described.

13. A binder attachment comprising a leaf-spring support having a slot, and a revoluble needle-clearer mounted in the slotted support and having a blade arranged to rotate in the slot thereof, and contiguous to the side of a binder-needle, substantially as described.

14. A binder attachment comprising a support, a revoluble needle-clearer having a driving element, and blades extending substantially at right angles to each other from said driving element and arranged for rotation contiguous to the sides of a binder-needle.

15. A binder attachment comprising a spring-support having an adjusting-slot near one end and a clearer-slot near its other end, a revoluble clearer journaled on the support in operative relation to the path of a binder-needle, and elements revoluble with said needle-clearer and projecting through the clearer-slot of the spring-support.

In testimony that I claim the foregoing as my own I have hereto affixed my signature in the presence of two witnesses.

HOWARD BUCKLEW.

Witnesses:
 G. S. BASSETT,
 B. F. MASON.